United States Patent [19]

Berringer

[11] 4,291,681
[45] Sep. 29, 1981

[54] FLAT PLATE HEAT EXCHANGERS

[76] Inventor: Robert T. Berringer, 571 Ascot Pl., Land O Lakes, Fla. 33539

[21] Appl. No.: 122,489

[22] Filed: Feb. 19, 1980

[51] Int. Cl.³ .............................. F24J 3/02; F28D 7/00
[52] U.S. Cl. .................................... 126/445; 165/161; 165/170
[58] Field of Search ............... 126/444, 445, 448, 450; 165/170, 159, 160, 161

[56] References Cited

U.S. PATENT DOCUMENTS

| 695,136 | 3/1902 | Baker | 126/445 |
|---|---|---|---|
| 2,358,476 | 9/1944 | Routh et al. | 126/445 |
| 4,007,728 | 2/1977 | Guba | 165/170 |
| 4,023,556 | 5/1977 | Sarazin | 126/445 |
| 4,085,728 | 4/1978 | Tomchak | 165/170 |
| 4,114,599 | 9/1978 | Stephens | 126/445 |
| 4,122,828 | 10/1978 | Diperi | 165/170 |
| 4,136,675 | 1/1979 | Karasick | 126/445 |
| 4,186,720 | 2/1980 | Schmauder | 126/445 |
| 4,203,425 | 5/1980 | Clark | 126/445 |
| 4,216,765 | 8/1980 | Deminet | 126/445 |

Primary Examiner—Daniel J. O'Connor

[57] ABSTRACT

A lightweight flat plate heat exchanger comprised of two or more essentially parallel flat plates which are formed and arranged to provide fluid flow passages between the plates. New combinations of plastic plates include the usage of transparent plastic foam and honeycomb structures. Improved shapes of flow passages include the usage of flow nozzles, flow diffusers, and jet pumps to increase fluid flow and heat transfer. The invention includes the usage of transparent plastic foam plates which are shaped to concentrate solar energy onto plastic tubes. Clear plastic tubes containing black heat transfer fluid are included. The invention includes the usage of spiral flow channels within plastic foam plates. Six different embodiments of the invention are included. Five of the embodiments could be used as efficient lightweight solar collectors.

1 Claim, 15 Drawing Figures

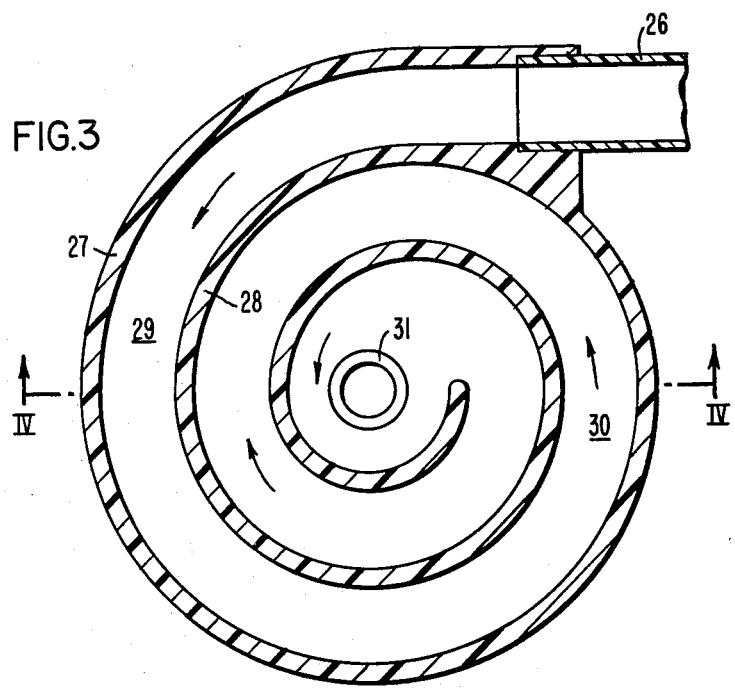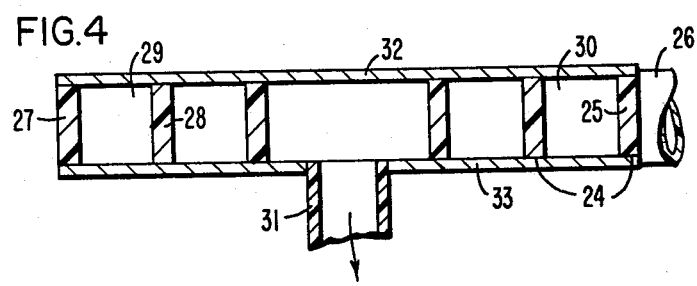

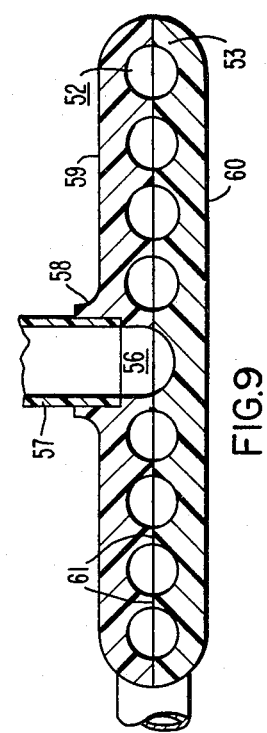
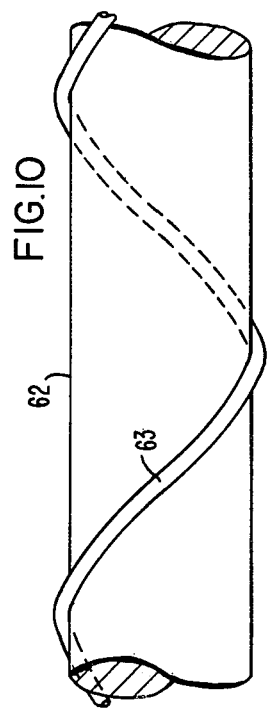
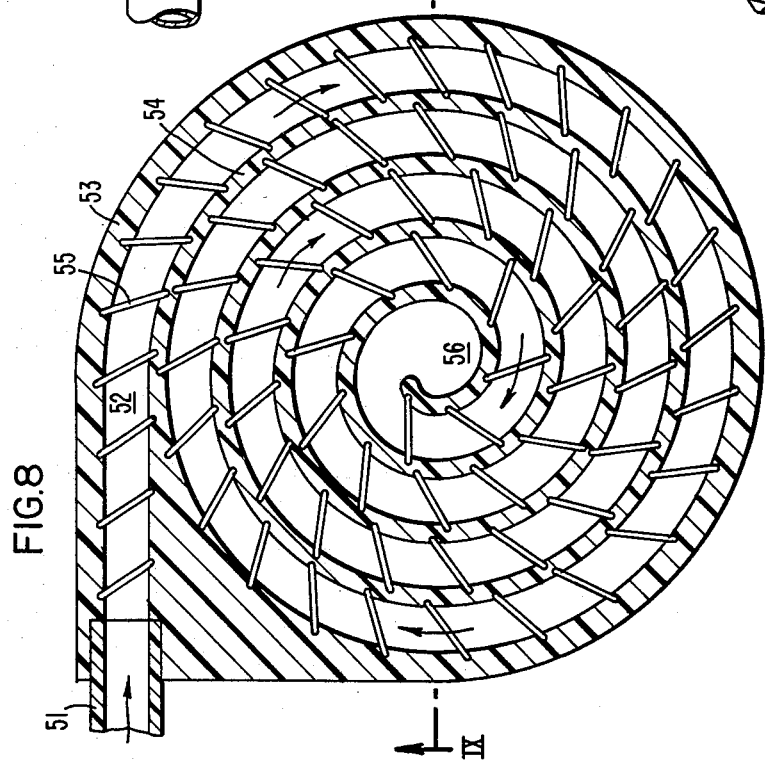

FLAT PLATE HEAT EXCHANGERS

BACKGROUND OF THE INVENTION

1. Field of the Invention

This invention relates to flat plate heat exchangers, and more particularly to light weight flat plate solar collectors.

2. Description of the Prior Art

There are three basic forms of heat transfer: conduction; convection; and radiation. In most flat plate heat exchangers, heat is transferred to the fluid by convection. Convection is a function of moving fluid properties. There are two types of convection: natural convection; and forced convection. Natural convection is caused by internal buoyancy forces and forced convection is caused by external forces, such as a pressure difference caused by a pump or fan. This invention, like most flat plate heat exchangers, relates to the transfer of heat to an internally contained flowing heat transfer fluid using forced convection. The standard equation for forced convection is $$Q(BTU/hr) = H(BTU/hr\, ft^{2\circ} F.) \times A(ft^2) \times \Delta T(^\circ F.)$$

where H is the film coefficient and A is the heat transfer surface area. This invention describes ways to increase "H" and "A" in flat plate heat exchangers and thus increase the amount of heat Q which can be transferred for a given temperature difference $\Delta T$ between the fluid and the wetted surface. The film coefficient is a function of the velocity distribution of the fluid adjacent to the heat transfer surfaces. Euler's equations of motion for three dimensional incompressible fluid flow determine the flow distribution.

$$X - 1/\rho\, \partial p/\partial x = u\, \partial u/\partial x + v\, \partial u/\partial y + w\, \partial u/\partial z + \partial u/\partial t \quad \text{Eq. 1}$$

$$Y - 1/\rho\, \partial p/\partial y = u\, \partial v/\partial x + v\, \partial v/\partial y + w\, \partial v/\partial z + \partial v/\partial t \quad \text{Eq. 2}$$

$$Z - 1/\rho\, \partial p/\partial z = u\, \partial w/\partial x + v\, \partial w/\partial y + w\, \partial w/\partial z + \partial w/\partial t \quad \text{Eq. 3}$$

where x, y, z are the components of the extraneous body forces and u, v, and w are the velocity components in the x, y, and z directions, respectively.

For one dimensional flow, such as in a pipe, Equation 1 describes the fluid velocity as a function of x, the length along the pipe.

For horizontal pipe flow, Equation 1 simplifies to the Bernoulli Equation for steady-state flow between points 1 and 2.

$$P_1 + \rho\, u_1^2/2g = P_2 + \rho\, u_2^2/2g + \Delta P \quad \text{Eq. 4}$$

For an efficient heat exchanger, it is desirable to keep the pressure loss $\Delta P$ low. This invention does this by streamlining flow passages and guiding the flow.

For two dimensional flow such as occurs between two flat plates, Equations 1 and 2 apply. It is important to this invention to differentiate between one-dimensional fluid flow and two-dimensional fluid flow. They have different equations, different heat transfer coefficients, and different pressure losses. Fluid flow is essentially one-dimensional if its flow distribution, heat transfer coefficients, and pressure losses can be essentially defined by one-dimensional equations (e.g. Eq. 4) or one-dimensional experiments (e.g., pipe networks). Fluid flow is essentially two-dimensional if its flow distribution, heat transfer coefficients, and pressure losses can be essentially defined by two-dimensional equations, (for example, Eq. 1 and Eq. 2) or two-dimensional experiments (e.g. water tables). Fluid flow is essentially three-dimensional if three-dimensional equations (for example Eq. 1, Eq. 2 and Eq. 3) are required to essentially describes its fluid flow and heat transfer characteristics.

Because two-dimensional flow has an extra degree of freedom over one-dimensional flow, two-dimensional heat exchangers can be designed to have higher efficiencies than one-dimensional heat exchangers. Accordingly, three-dimensional heat exchangers such as finned tube radiators often have the highest efficiencies.

Most flat plate heat exchangers utilize one-dimensional fluid flow passages such as tubes fastened on one flat plate or channels formed between two essentially flat plates. One group of patents to which this invention is related uses internal baffles to form essentially one-dimensional flow channels in a rectangular serpentine pattern (Deminet U.S. Pat. Nos. 3,981,294; Tomchak 4,085,728; and Hobbs 4,048,981). There is a small group of flat plate heat exchangers which show essentially two-dimensional fluid flow passages utilizing parallel baffle means or manifolds to split the flow into two or more channels, most of which are essentially one-dimensional (Bausal U.S. Pat. Nos. 4,117,831; Di-Perl 4,122,828; and Skrivseth 4,099,513). This invention utilizes various versions of streamlining and turbulent heat transfer augmentation found in three-dimensional applications (e.g. Lage U.S. Pat. No. 1,356,114) but not found in existing flat plate heat exchangers.

SUMMARY OF THE INVENTION

This invention provides heat exchanger apparatus which are more efficient and lighter weight than the prior art. Improvements are made in the usage of various two and three-dimensional flow patterns to increase the efficiency of heat transfer. Some recent developments in plastic foam materials and honeycomb shapes are utilized to advance the state-of-the-art of flat plate heat exchangers. It includes using clear plastic foam in advantageous shapes for flat plate solar collectors. The invention includes using pre-shaped (e.g. cast) plastic foam to form various two-dimensional and three-dimensional flow patterns. It includes the usage of nozzles, diffusers, and jet pumps in flat plate heat exchangers. New combinations of plastic foam, plastic tubing, and black heat transfer fluids are included.

DESCRIPTION OF THE DRAWINGS

The functions and advantages of this invention will become more apparent from the following detailed description in connection with the accompanying drawings, in which:

FIG. 3 is a top elevation sectional view of a second embodiment of the invention.

FIG. 4 is a cross-sectional view along the line IV—IV of FIG. 3.

FIG. 8 shows a top elevation sectional view of a fourth embodiment of the invention.

FIG. 9 shows a center cross-sectional view along the line IX—IX of FIG. 8.

FIG. 10 is a fragmentary perspective view of a forming tool for the embodiment shown in FIG. 8.

Returning to FIG. 1 which shows one preferred embodiment of the invention as a solar collector, a plastic inlet nozzle 2 brings a high velocity fluid jet 3 into the flat plate solar collector. Black water is the preferred heat transfer fluid. The fluid jet expands 5 within flow guides 4a and 4b which form a two-dimensional diffuser. A flow guide 6 splits the flow into two flow channels. Two discontinuous flow guides 7a and 7b then split the flow again into four flow channels. Flow in channel 8b is turned by streamlined discontinuous two-dimensional flow guides 9a and 9b. The exterior flow channel boundary 10 forms one side of another two-dimensional flow diffuser channel 11. Flow guide 12 is used to turn the flow into a converging two-dimensional flow nozzle 13. The fluid jet from flow nozzle 13 combines with the flow 3 from the inlet nozzle 2. The combined jets recirculate as in a jet pump. With proper design, the flow at 13 is larger than the inlet flow, with resulting increases in heat transfer. Flow leaves the recirculation channels through exit channels 14a and 14b. Another two-dimensional flow diffuser channel 15 is used to reduce pressure drops. Fluid exits through outlets 16a and 16b. FIG. 2 shows that except for the inlet nozzle and outlet pipe 23a, the entire heat exchanger is comprised of two plates with cavities. The top plate 20 is a transparent plastic box type sandwich structure with square air cavities. The bottom plate 21 is rigid plastic foam plate with open cavities. The two plates are bonded together along their plane of contact 22 to form the flow channels and contain the fluid.

FIG. 3 shows a second embodiment of the invention as a spiral diffuser. Water enters the plastic inlet pipe 26. The flow 29 is turned by exterior flow guide 27 and interior flow guide 28 which forms a curved two-dimensional flow spiral. Flow 30 continues until it reaches the outlet pipe 31. FIG. 4 shows an aluminum top sheet 32 and an aluminum bottom sheet 33 bonded 24 to spiral plastic foam guides 25, 27 and 28. The plastic foam guides are all continuous and formed as one thick plate with large cavities. Heat is transferred from flowing water to the aluminum sheets 32 and 33 and subsequently to a surrounding fluid. For example, a series of FIG. 3 units could be stacked inside a metal drum filled with water. Such an embodiment of the invention forms a lightweight, economical, and efficient heat exchanger between two fluids.

FIG. 5 shows a third embodiment of the invention as a square flat plate solar collector. Water enters the solar collector through plastic inlet pipe connectors 34a and 34b. Fluid jets 35a and 35b enter three-dimensional flow channels 36a and 36b which turn the flow in a curved converging flow nozzle. Exiting fluid jets 39a and 39b enter two more three-dimensional curved flow nozzle channels 40a and 40b. The fluid jets 42a and 42b leaving nozzles 40a and 40b are turned by the curved shape of the exterior walls of the flow channels 43a and 43b. Fluid jets 42a and 42b continue in a counterclockwise direction and interact with inlet jets 35b and 35a, respectively. It is important to note that the fluid jet 42a which initially came from inlet jet 35a is now mixing and exchanging energy with inlet fluid jet 35b. Thus, this embodiment can be used to exchange energy or mix two different fluids. Aided by a momentum transfer from fluid jets 35b and 39a, fluid jet 42a will continue to recirculate in a counterclockwise direction around center post 46a. Similarly, fluid jet 42b will continue to recirculate in a counterclockwise direction around center post 46b. Fluid exits through outlet pipes 45a and 45b. Flow around these locations is clockwise. The overall two-dimensional flow pattern is an interference free mixing of swirling water aided by tangential jets. The resulting circulation flow is higher than the inlet flow with high turbulence and high heat transfer rates. FIG. 6 shows a thick, transparent plastic foam top plate 47 and a thick plastic foam bottom plate 48 bonded together at their flat mating surface 49. A thin black aluminum plate 50 is bonded to the top surface at the bottom plate 48. Preformed cavities in the plastic foam plates are used to form the flow channels for fluid jets 36a, 36b, 43a, and 43b. Flow guides 37a, 37b, and 38 form flow channel boundaries. FIG. 7 shows a fragmentary cross-sectional view through center post 46b and the curved channel for fluid jet 40b. Curved flow guide 41 is a three-dimensional shape to guide curved fluid jet 40b on the one side and counterclockwise swirling flow in the other side. Solar energy is absorbed by the black aluminum plate and transferred by forced convection to the highly turbulent swirling water.

FIG. 8 shows a fourth embodiment of the invention as a round flat plate solar collector. Black water enters the heat exchanger through plastic pipe inlet connector 51. A curved essentially circular flow passage 52 is formed by flow guides 53 and 54. The flow channel 52 has recessed spiral grooves 55 to swirl the flow, increase turbulence, and increase heat transfer. The grooved three-dimensional flow channel 52 continues in a spiral arrangement towards the center of the round flat plate solar collector, where the exit cavity 56 is located. FIG. 9 shows a thick transparent plastic foam top plate 59 and a thick transparent plastic foam bottom plate 60, both plates bonded together at their mating surfaces 61. Matching cavities in both plates form the flow channel 52. The plastic exit pipe 57 is reinforced with a circular boss 58 on the top plate 59. FIG. 10 shows a fragmentary section of a flexible copper bar 62 with a spiral copper wire 63 which is used in a mold to form the spiral grooves in the flow channel 52. One or more of the circular flat plate solar panels shown in FIG. 8 and FIG. 9 can be used with reflectors to form a lightweight, low cost, efficient solar collector. Solar energy can enter the transparent plastic foam from all sides to heat the swirling black water.

FIG. 11 shows another embodiment of the invention as a solar collector which utilizes clear plastic foam to help concentrate solar energy onto black plastic tubes. Heat transfer fluid 64 enters the solar collector thru plastic inlet pipe connecter 65, passes thru a black plastic tube 66, and exits thru the plastic outlet pipe connector 67. FIG. 12 is a fragmentary cross-sectional view. A thin clear plastic sheet 68 provides a protective cover which is bonded to a clear plastic foam upper plate 69. The clear plastic foam is shaped prior to assembly to concentrate solar energy onto black plastic tube 66 which contains the heat transfer fluid 64. The upper plate 69 is bonded to the geometrically similar clear plastic lower plate 70. A thin aluminum sheet 71 is bonded to plate 70 to reflect solar energy onto the black plastic pipe 66. Sheet 71 is bonded also to a structural plastic foam plate 72 which provides support and insulation for the solar collector.

FIG. 13 shows another embodiment of the invention as a flat plate solar collector. A transparent plastic cover 74 and a plastic foam base 73 are both molded to form large cavities 79. These cavities are filled with low thermal conductivity gas to reduce heat losses from the black aluminum upper sheet 76 and lower aluminum sheet 77. Water tubes 75 are used to remove the heat. FIG. 14 shows an aluminum filled bonding agent 78 to provide good heat transfer between the black upper aluminum sheet 76 and the lower aluminum sheet 77. FIG. 15 shows how the same high thermal conductivity bonding agent 78 is used to conduct heat from the aluminum sheets 76 and 77 to the water tube 75.

Figure 1:
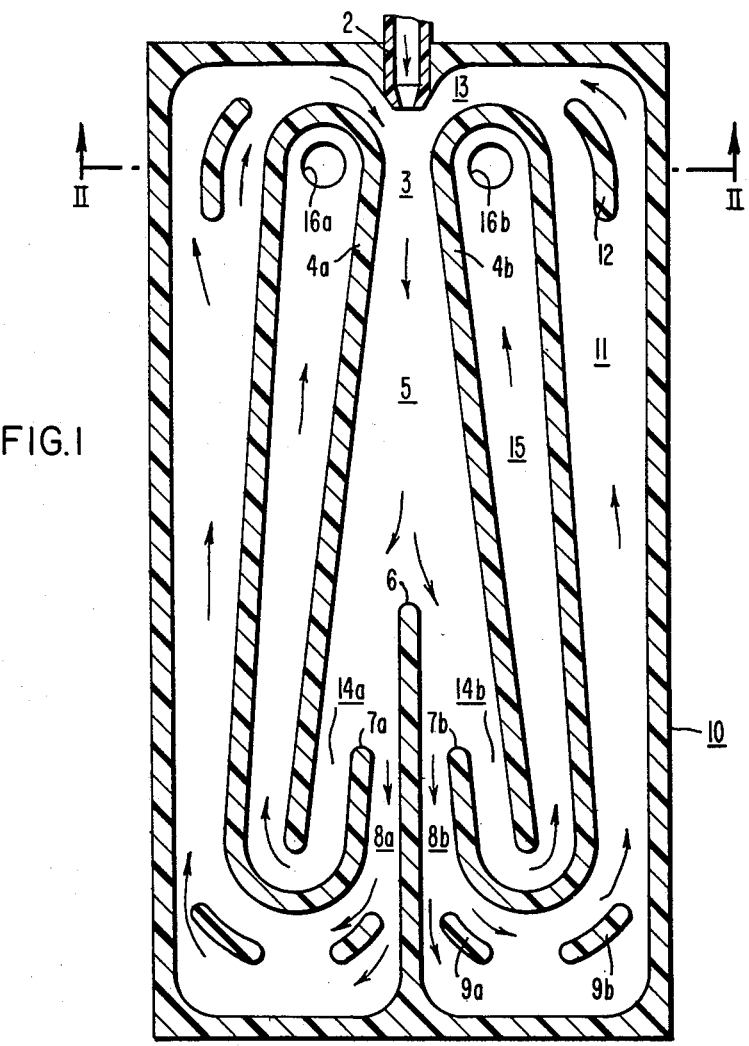
FIG. 1 is a top elevation sectional view of one preferred embodiment of the invention as a solar collector.
Figure 2:
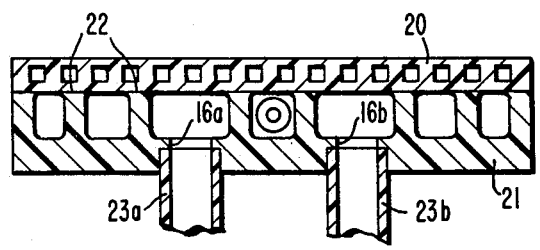
FIG. 2 is a cross-sectional view along the line II—II of FIG. 1.
Figure 5:
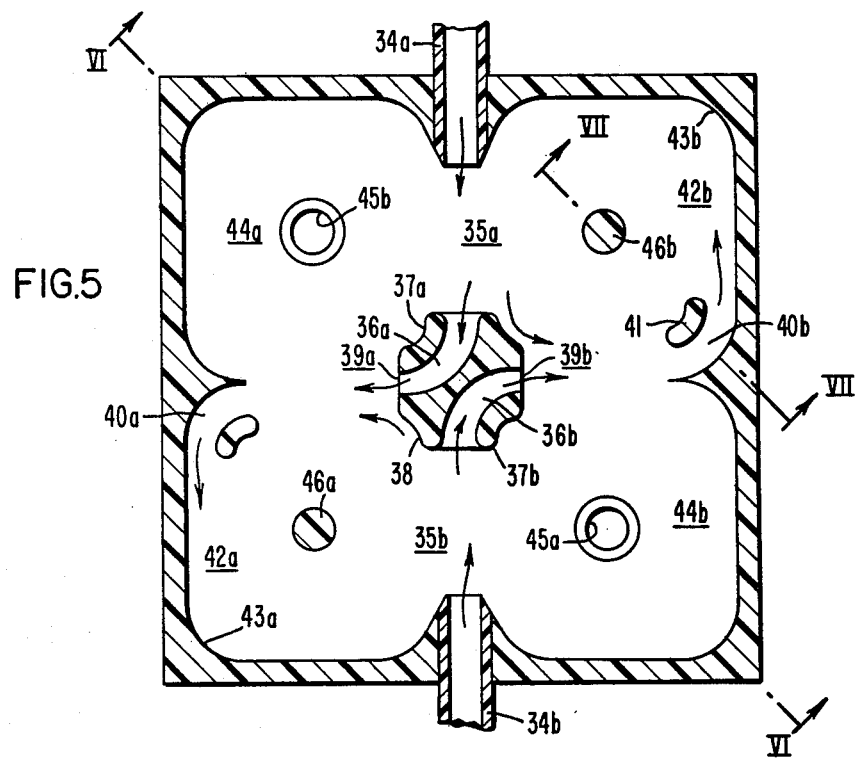
FIG. 5 shows a top elevation sectional view of a third embodiment of the invention.
Figure 6:
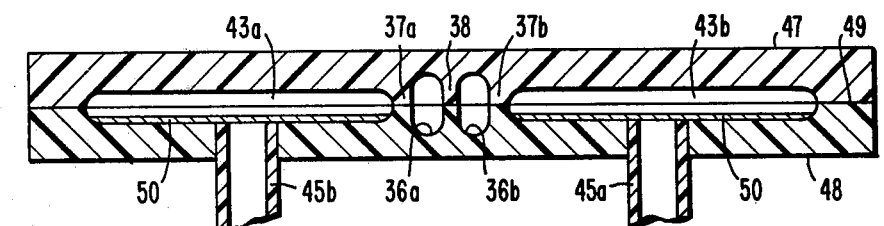
FIG. 6 shows a cross-sectional view along the line VI—VI of FIG. 5.
Figure 7:
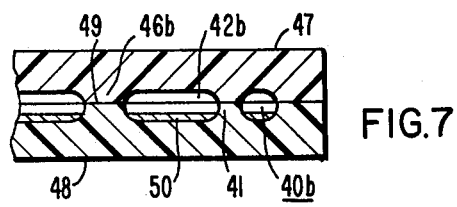
FIG. 7 shows a fragmentary sectional view along the line VII—VII of FIG. 5.
Figure 11:
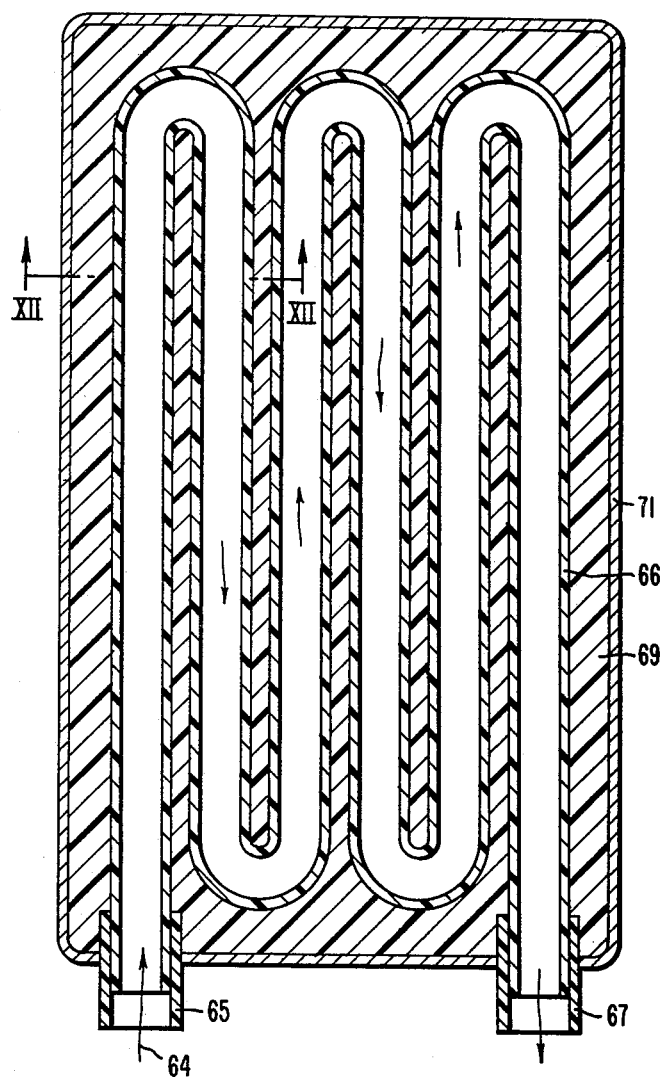
FIG. 11 shows a top elevation sectional view of a fifth embodiment of the invention.
Figure 12:
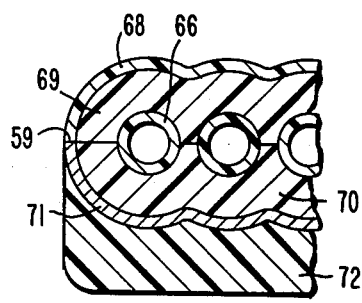
FIG. 12 shows a fragmentary cross-sectional view along the line XII—XII of FIG. 11.
Figure 13:
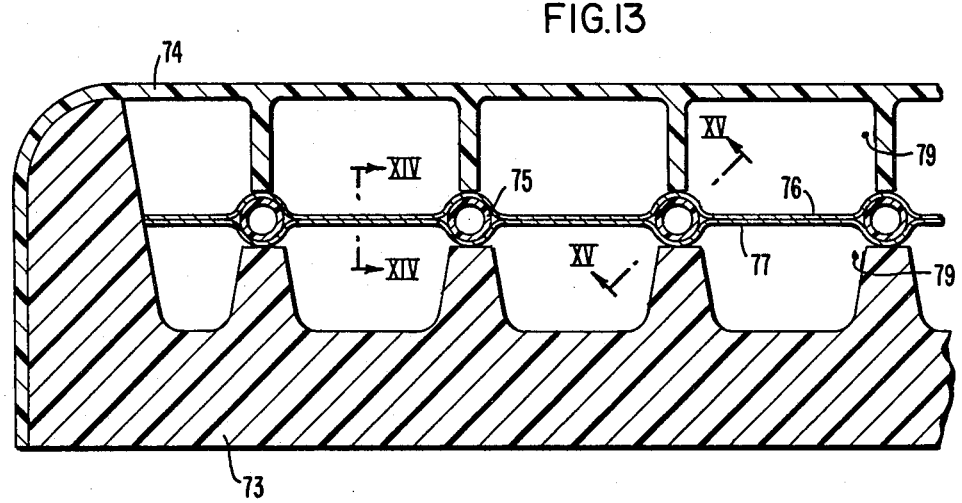
FIG. 13 is a fragmentary cross-sectional view of a sixth embodiment of the invention.
Figure 14:
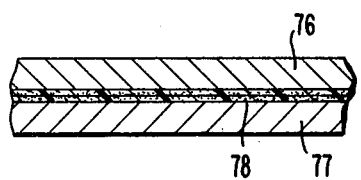
FIG. 14 is a fragmentary transverse sectional view along the line XIV—XIV of FIG. 13.
Figure 15:
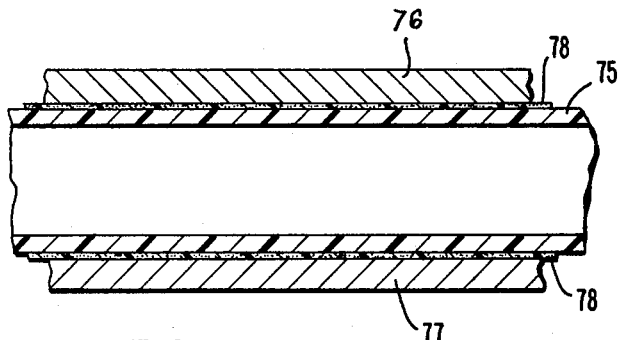
FIG. 15 is a fragmentary transverse sectional view along the line XV—XV of FIG. 13.

It is, therefore, seen that the solar panels and other flat plate heat exchangers formed using this invention can be of very lightweight and very efficient utilization of materials and energy. It will be apparent that many modifications and additions are possible in view of the above teachings. It is, therefore, to be understood that within the scope of the appended claims, the invention may be practiced other than as specifically described.

I claim, as my invention:

1. A flat plate solar energy collector comprising a bottom plate of rigid plastic foam material, said bottom plate having four side walls and multiple flow guides within said side walls, an inlet nozzle on a first of said side walls, a straight flow guide opposite said nozzle and extending from a second side wall whereby fluid from the inlet nozzle is split into two flow channels, the area between said nozzle and said straight flow guide comprising a diffuser means, means comprising two elongated curved discontinuous flow guides to further split said two flow channels into four flow channels, two exit ports in said bottom plate with each exit port lying within the confines of one of said two elongated curved discontinuous flow guides, said exit ports being located near the nozzle side of the solar collector, plural relatively short flow guide means for directing fluid from said second side wall back to said first side wall to be combined with flow from said nozzle, wherein all of said flow guides are formed as a unitary structure with said plastic bottom plate, a transparent plastic top plate secured over said bottom plate to admit sunlight to fluid in the collector.

* * * * *